United States Patent [19]

Meyer, Jr

[11] 4,434,557

[45] Mar. 6, 1984

[54] INDICATOR SNAP GAGE ASSEMBLIES

[76] Inventor: Franklin Meyer, Jr, P.O. Box 1, Forestdale, R.I. 02824

[21] Appl. No.: 448,840

[22] Filed: Dec. 10, 1982

[51] Int. Cl.³ .............................................. G01B 5/08
[52] U.S. Cl. ................ 33/148 R; 33/149 R; 33/178 R
[58] Field of Search ............ 33/148 R, 143 R, 147 H, 33/143 F, 147 M, 147 R, 148 F, 148 G, 149 R, 174 Q, 178 R, 178 D, 179.5 R, 179.5 D

[56] References Cited

U.S. PATENT DOCUMENTS

| 1,543,795 | 6/1925 | Rockwell | 33/148 R |
|---|---|---|---|
| 2,362,615 | 11/1944 | Clement | 33/148 R |
| 2,591,453 | 4/1952 | Maag | 33/178 R |
| 2,728,144 | 12/1955 | Nilsson | 33/143 R |
| 3,222,788 | 12/1965 | Neslund | 33/178 R |

FOREIGN PATENT DOCUMENTS

| 908333 | 4/1946 | France | 33/148 F |
|---|---|---|---|
| 1112948 | 3/1956 | France | 33/178 D |

*Primary Examiner*—Willis Little
*Attorney, Agent, or Firm*—Maurice R. Boiteau

[57] ABSTRACT

A snap gage assembly is releasably mounted on a standard amplifying and indicating mechanism which provides a graduated indication of a dimension of a workpiece to which the assembly is applied. The assembly includes a fixed jaw and a movable jaw, both of which may be either generally flat and parallel or include rolls for contacting spline and gear teeth or other indentations.

9 Claims, 11 Drawing Figures

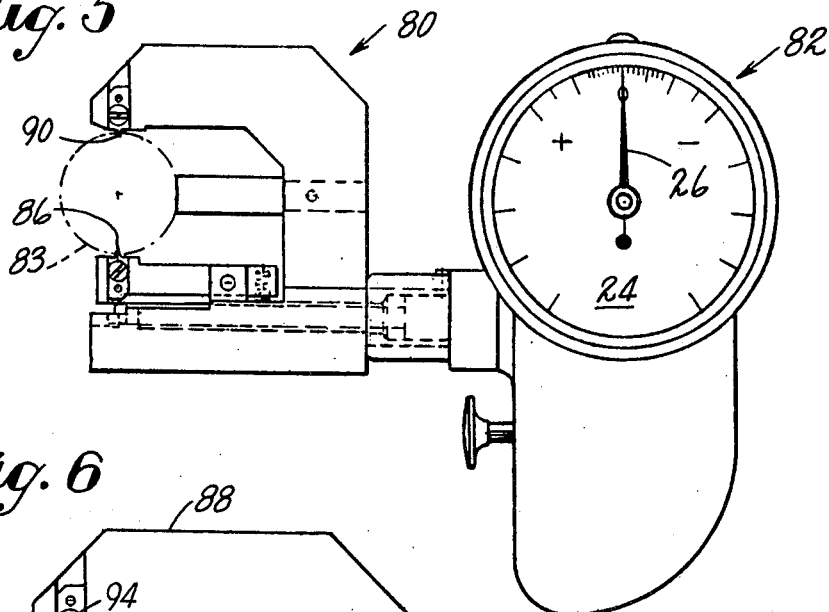
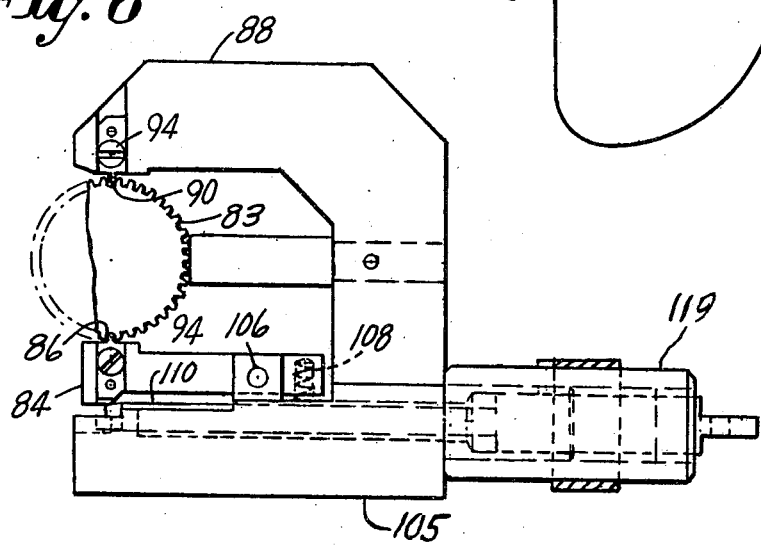
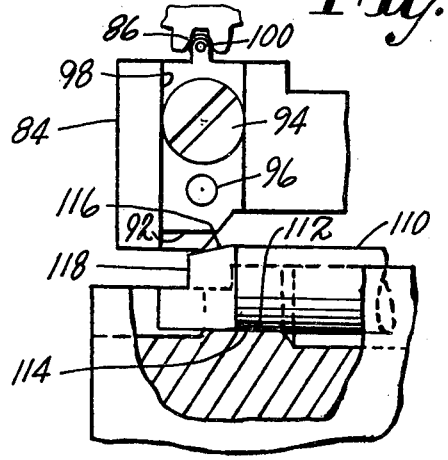

INDICATOR SNAP GAGE ASSEMBLIES

The present invention relates generally to improvements in indicator snap gage assemblies employed for comparative graduated measurements of external dimensions and more particularly to such assemblies which are adapted to being releasably and interchangeably coupled to standard amplifying and indicating mechanisms.

In production gaging, many conditions are encountered in which a large number of like parts or workpieces are to be measured to ascertain the degree of deviation of an external dimension from its nominal size. It frequently happens that the dimension, location and/or environment to be measured either require or render much more convenient, the use of a snap gage for the purpose. In some applications, all that is needed is a determination that the measured dimension is acceptable because it lies within an established tolerance band. There are many circumstances, however, in which it is also necessary to determine as exactly as possible, the degree of deviation from the basic dimension. It is necessary to determine the deviation of dimensions for such purposes as tool setting, statistical analysis for quality control and for selective assembly of mating parts.

Whenever there is a need for an indicator snap gage to provide the necessary information, there is a choice of standard designs available for the purpose. However, such conventional designs are usually single purpose, dedicated gage assemblies subject to numerous shortcomings. A first disadvantage is that such standard snap gages, which usually include adjustments within broad ranges, tend to be larger than would otherwise be necessary and therefore bulky and clumsy to use. An equally serious disadvantage is that standard snap gages may easily become misadjusted, either accidentally or through deliberate tampering by an operator. Such misadjustments of gaging instruments can result in the manufacture of large numbers of defective workpieces. Other disadvantages of standard indicator snap gages include a generally limited relative motion of the measuring surfaces in precision applications requiring above average resolution of the graduations on the dial indicator face. In order to limit the weight of standard indicator snap gages, in view of their generally greater bulk necessary to provide an extended range of measurements, such gages tend to lack sufficient ruggedness to withstand rough usage under production conditions when the gage is sometimes handled by persons of limited skill.

It is an object of the present invention to improve the reliability of graduated gaging of external dimensions.

A more particular object is to provide an indicator snap gage which is not readily misadjusted and which may be readily and quickly calibrated.

Another object is to advance the durability and flexibility of indicator snap gage assemblies.

Still another object is to reduce both the size and weight of indicator snap gages applicable to the measurement of a given dimension.

In the achievement of the foregoing objects, a feature of the invention relates to the construction of a snap gage assembly which is releasably coupled to a conventional amplifying and indicating mechanism. The assembly includes a body formed with a fixed jaw providing one of the measuring surfaces and a movable jaw which provides a second coacting measuring surface. The movable jaw, according to a feature of the invention is pivoted about an integral hinge and is urged into contact with the workpiece being measured by a plunger having a tapered tip engaging the movable jaw. The plunger provides the connection between the amplifying and indicating mechanism at its outer end and the movable jaw which is pressed into engagement with the workpiece by a spring force exerted by the amplifying and indicating mechanism.

According to another feature of the invention, an alternative form of snap gage includes a movable jaw pivoted for greater motion than that possible with the integral hinge. The alternative form allows a greater degree of separation of the jaws to permit their disengagement from a depression in the workpiece at the same time that high amplification and resolution are maintained. This is a substantial advantage in applications to the measurement of gear or spline teeth which are contacted generally by rolls near their pitch diameters. Since the teeth must often be approached radially, considerable separation of the jaws is required and this is accomplished according to a related feature by a specially formed plunger tip which allows the movable jaw to drop substantially away from the workpiece and to be positioned for approach to and withdrawal from the workpiece, outside the measuring range of the snap gage assembly.

The foregoing objects and features, together with numerous advantages of the present invention will be more fully understood and appreciated from the following detailed description of illustrative embodiments taken in connection with the accompanying drawings in which:

FIG. 5 is a view in side elevation of an alternative form of snap gage shown fitted with rolls for contacting the surfaces of external gears and splines and shown mounted on an amplifying and indicating mechanism;

FIG. 6 is a view in side elevation and on an enlarged scale of the snap gage depicted in FIG. 5;

FIG. 7 is a detail view in cross section and on a greatly enlarged scale showing a potion of a movable jaw and its relationship to a coupling plunger forming a part of the gage of FIGS. 5 and 6;

Figure 1:
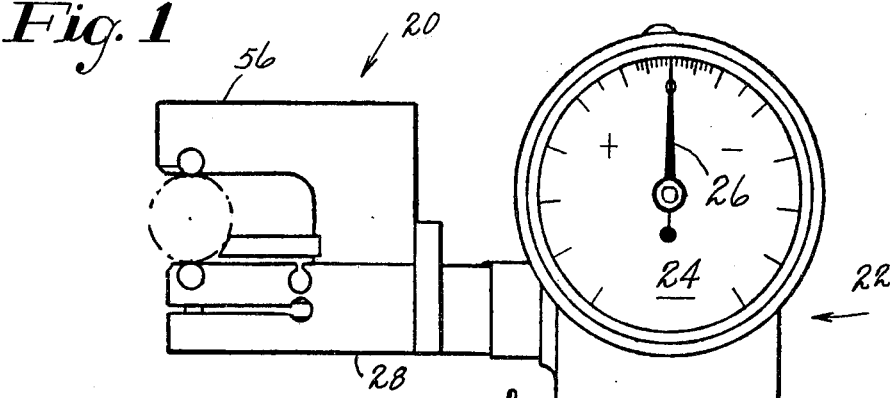
FIG. 1 is a view in side elevation of a snap gage according to the present invention, shown connected to a standard conventional amplifying and indicating mechanism, the combination being in the process of measuring the diameter of a cylindrical workpiece.
Figure 2:
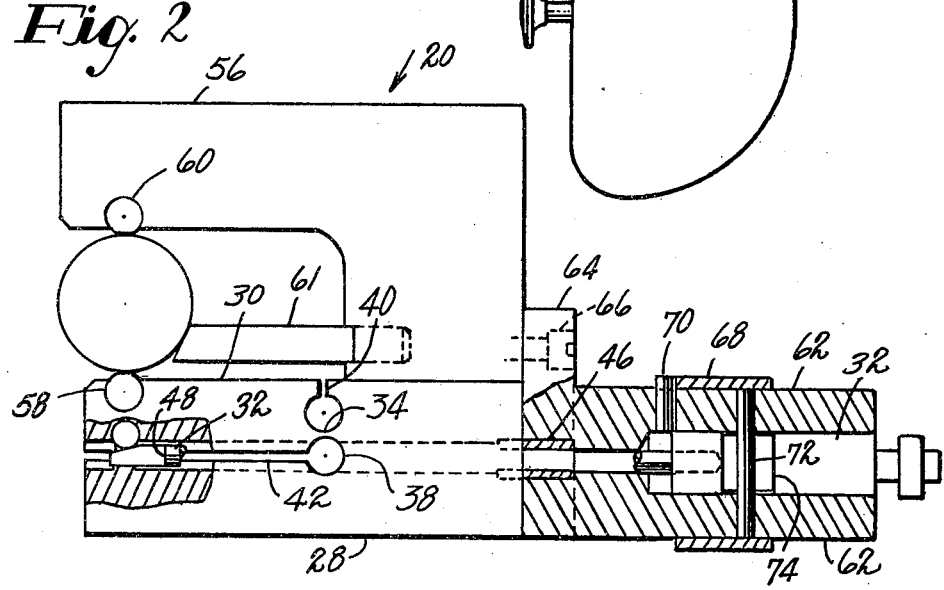
FIG. 2 is a view in side elevation and on an enlarged scale of the snap gage of FIG. 1, shown with portions in cross-section to illustrate details of interior construction.
Figure 3:
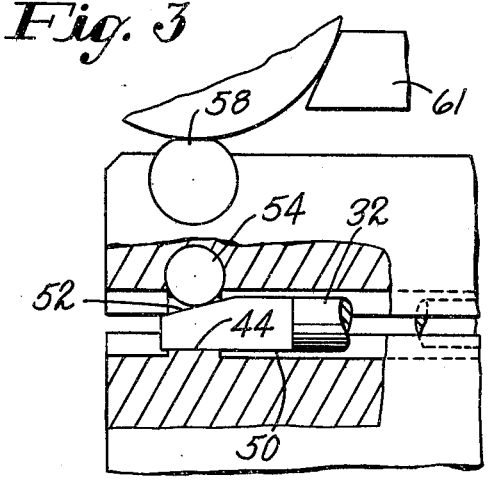
FIG. 3 is a detail view in cross section and on a greatly enlarged scale depicting a connection between a plunger and a movable jaw forming part of the snap gage of FIGS. 1 and 2.
Figure 4:
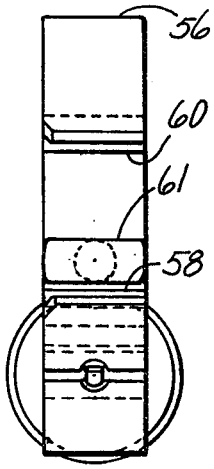
FIG. 4 is a view in left end elevation of the snap gage depicted in FIG. 2.

Turning now to the drawings, there is shown in FIGS. 1 to 3, a snap gage assembly according to the invention including a gage head indicated generally at 20, mounted on an amplifying and indicating mechanism indicated generally at 22. In the course of this specification, the gage head 20 and alternative constructions will be described in detail. It will be understood, however, that the mechanism 22 is a conventional instrument such as that disclosed in U.S. Pat. No. 1,652,854 granted Dec. 13, 1927 upon application of Philip J. Darlington and that the present invention relates to the construction of gage heads and their combination with the mechanism to achieve measuring applications beyond the scope contemplated in the patent. It is sufficient to point out at this time, that the mechanism 22 includes a graduated dial 24 on which size deviations are displayed by a pointer 26.

The gage head 20 includes a base 28 in which there is provided a movable jaw 30 coupled by a plunger 32 to the mechanism 22. The jaw 30 is designed for limited pivotal movement about an integral hinge 34 formed by spaced apart drilled openings 36 and 38 and the jaw is defined by slots 40 and 42. The base 28 is formed with a longitudinal guideway in which the plunger 32 is slidably received. At its forward end, to the left as seen in FIGS. 2 and 3, the guideway comprises a precision bore 44, aligned with a bushing 46 into which the plunger 32 is closely fitted for sliding motion. The forward tip of the plunger 32 is flatted on both sides up to a line 48, the bottom of the plunger tip is cylindrically shaped at 50 to fit the bore 44 while the upper surface of the tip is tapered at 52 to engage a cross pin 54 pressed in the movable jaw 30 and extending into the bore 44. The opposite end of the plunger 32 is adapted to being coupled to the amplifying and indicating mechanism 22. Since amplification is obtained in the present assembly from the gage head as well as from the amplifying and indicating mechanism, the included angle of the tapered tip may be varied to provide a greater or lesser degree of amplification with corresponding graduations on the face of the dial 24.

An upper stationary jaw 56, which is L-shaped and secured to the body 28 by screws, not shown, cooperates with the movable jaw 30 to embrace the workpiece for measuring. The jaws 30 and 56 are provided with wear resistant inserts 58 and 60 respectively, generally of tungsten carbide and each formed with a flat workpiece contacting surface. The two inserts 58 and 60 are fixedly secured in their respective jaws and the work contacting surfaces are oriented parallel to each other. In the drawings, the projection of the inserts 58 and 60 above adjacent surfaces is exaggerated for clarity but in practice the workpiece contacting surfaces projects only a few thousandths of an inch above. There is also a fixed stop 61 having an angularly oriented outer end for limiting the engagement of the gage head 20 with the workpiece and for directing the workpiece into engagement with the fixed jaw insert 60. In addition to the base 28 and the stationary jaw 56, the body of the gage 20 comprises a tubular cylindrical stem 62 formed with a flange 64 by which it is affixed to the base 28 and the stationary jaw 56 by a screw 66. The stem 62 is maintained in alignment with the bore by the bushing 46 and is exteriorly fitted with a locating sleeve 68 positioned on the stem by a pin 70. The sleeve 68 performs dual functions of locating the gage head 20 when it is coupled to the mechanism, the stem 62 being clamped in an appropriate socket in the mechanism. The other function is that of retaining a pin 72 which passes through a slot 74 in the plunger 32 to limit its motion.

The calibration of the gage assembly 20, 22 is accomplished with a cylindrical master ground precisely to the basic diemension of the workpiece to be measured. With the master between the jaws in the position to be later occupied by workpieces, the scale 24 is turned so that the pointer 26 indicates zero. Thereafter, when the gage head is applied to a workpiece, the pointer indicates the deviation either plus or minus from the basic value of the dimension of the workpiece.

Figure 8:
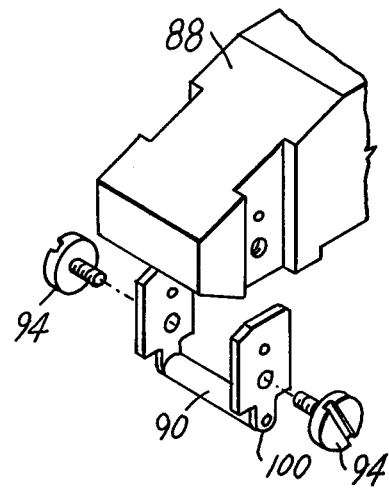
FIG. 8 is a fragmentary detail view in perspective showing the mounting of a tooth measuring roll on a fixed jaw of the snap gage depicted in FIGS. 5 and 6.
Figure 9:
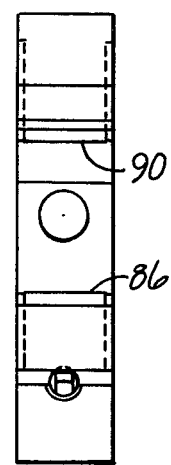
FIG. 9 is a view in end elevation of the snap gage depicted in FIG. 6.

There is shown in FIGS. 5 and 6, a gage head indicated generally at 80, coupled to an amplifying and indicating mechanism indicated generally at 82 and of the same construction as the mechanism 22. The gage head 80 is in some respects similar to the head 20 but differs from the latter in that the head 80 is especially adapted to measuring gear or spline teeth of a workpiece 83. It is accordingly advantageous that the jaws carry measuring rolls to engage the teeth near their pitch diameter. For this purpose, a movable jaw 84 is fitted with a roll 86 and a stationary jaw 88 is equipped with a like roll 90, best seen in FIGS. 7 and 8. The rolls 86 and 90 are retained on their respective jaws by perforated clips 92, one at each end, secured by a screw 94 and located by a dowel 96 in a slot 98. Each clip 92 is formed with a perforation 100 into which is loosely received a reduced end of the roll which is thereby permitted to float slightly in seating itself into contact with the gear teeth and its related jaw.

The jaw 84 is pivoted on a base 105 at 106 and urged by a compression spring 108 in a counterclockwise direction to carry the roll 86 away from the workpiece 83. In order to couple the jaw 84 and the roll 86 to the mechanism 82, there is provided a plunger 110 which is pressed into contact with the jaw by a spring force supplied by the mechanism. The tip of the plunger 110 is flatted on both sides in a manner sililar to that of the plunger 32 but is otherwise modified to permit the roll 86 to be lowered substantially out of engagement with the teeth on the workpiece 83. The plunger 110 at its forward or left end as seen in FIG. 6 and as best seen in FIG. 7 is slidably received in a precision bore 112, which is cut away at the top to allow clearance for the bottom of the jaw 84 to swing downwardly when the plunger 110 is withdrawn. Location of the plunger 110 at the forward end is provided by a cylindrical surface 114 which fits the bore 112. Coupling of the plunger 110 to the jaw 84 and thereby to the roll 86 is through a wedge surface 116 near the front end of the tip, which engages a lower corner of the jaw 84 in a manner similar to that occurring between the plunger 32 and the pin 54. When the wedge surface 116 presses against the jaw 84, the spring 108 is overcome by the superior force applied by the plunger. In order to cause the jaw 84 so that the roll 86 is disengaged from the teeth of the workpiece, the plunger is truncated at 118 so that the jaw may drop substantially under the urging of the spring 108 when the plunger is withdrawn through its coupling to the mechanism 82.

Figure 11:
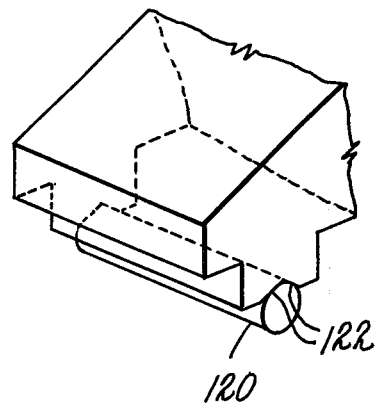
FIG. 11 is a fragmentary detail view in perspective showing an alternative mode of mounting a gear tooth contacting roll on the fixed jaw of a gear measuring snap gage.

There is shown, in FIG. 11, a measuring roll mounting structure which is especially useful when the rolls are of small diameter and hence too fragile for mounting as shown in FIGS. 5 to 8. The showing of FIG. 11 which is greatly exaggerated for clarity, is of a roll 120 affixed in a Vee-shaped groove 122. This arrangement deprives the roll of the ability to float in contacting the teeth of the workpiece but, considering the necessary fragile nature of the rolls, is adapted to providing an accurate measurement of the chordal tooth thickness of gears and splines. In order to obtain maximum accuracy, the groove 122 and a similar one in the opposite jaw are ground parallel within very close tolerances and the rolls are carefully fixed in the grooves, generally by hard soldering.

Details that have not been described in the construction of the gage head depicted in FIGS. 5 to 9 are essentially equivalent to the details of construction of the gage head 20 shown in FIGS. 1 to 4. A minor difference is that a cylindrical stem 119 is integral with the base 105 but is otherwise located in and coupled to the mechanism 82 in the same manner as the head 20 in the mechanism 22.

Figure 10:
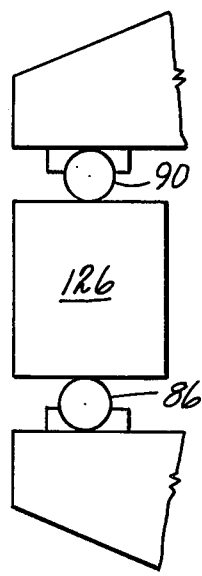
FIG. 10 is a fragmentary detail view in side elevation and on an enlarged scale showing the setting of a gear measuring snap gage with an appropriate master.

In FIG. 10, there is illustrated the calibration of a gear tooth measuring gage in which rolls 86 and 90 are schematically represented. The calibration is accomplished with a master 126 having parallel surfaces and sized precisely to the basic dimension over rolls, which is the usual measurement of chordal thickness of splines and gears, less twice the diameter of the rolls. With the two rolls in contact with the master 126 and also contacting the jaws 84 and 88, the dial of the mechanism 82 is set to indicate zero and thereafter deviations from the basic dimension, either plus or minus in the measurement of workpieces are read on the dial.

From the foregoing description of various embodiments of the present invention, many variations within its scope will become apparent to those of ordinary skill in the precision measuring art. For example, a gage head such as that illustrated in FIGS. 5 to 9 may be modified in various ways to adapt it to measuring a dimension to the bottom of a groove or other depression in a workpiece without gear or spline teeth. For such a purpose, it would only be necessary to employ the equivalent of the plunger and jaw construction whether or not a roll formed part of the movable jaw and whether the opposing jaw were provided with a measuring roll, were flat or had some other configuration. It is accordingly not intended that the foregoing description and drawings be taken by way of limitation, but rather that the scope of the invention be interpreted in terms of the appended claims.

Having thus disclosed my invention, what I claim as new and desire to secure by Letters Patent of the United States is:

1. An indicator snap gage head adapted to being releasably coupled to an indicator mechanism for indicating, on the mechanism, a graduated value of an external dimension of a workpiece, comprising a base, a fixed jaw mounted on the base and having a workpiece engaging surface spaced from the base, a movable jaw pivotally mounted on the base opposite the fixed jaw for movement in a measuring plane toward and away from the fixed jaw, the pivot being located inwardly towards the mechanism from the measuring plane and interconnecting means between the movable jaw and the indicator mechanism including a spring-pressed plunger slidable in the base in a direction generally perpendicular to the measuring plane and having a tapered end engaging the movable jaw and its opposite end adapted to be releasably coupled to the indicator mechanism for urging the movable jaw toward the fixed jaw and for translating, by the degree of its taper, the position of the movable jaw in engagement with the workpiece into an indication on the mechanism of the value of the dimension.

2. An indicator snap gage head according to claim 1 further characterized in that the pivotal mounting of the movable jaw includes an integral hinge interconnecting the movable jaw with the base.

3. An indicator snap gage head according to claim 1 further comprising a fixed stop on the base, having an angularly oriented end surface adapted to engage a cylindrical workpiece near an axial plane generally parallel to the length of the plunger for urging the workpiece toward the fixed jaw.

4. An indicator snap gage head according to claim 1 further characterized in that the plunger is slidable in a bore in the body and that its tapered tip is wedge-shaped and that the movable jaw includes a surface in contact with the wedge-shaped tip.

5. An indicator snap gage head adapted to being releasably coupled to an indicator mechanism for indicating, on the mechanism, a graduated value of a dimension measured inside an outer dimension of the workpiece and in a measuring plane, comprising a base, a plunger slidable in the base in a direction generally perpendicular to the measuring plane, a jaw fixedly supported on the base and having a workpiece contacting surface, a movable jaw pivoted on the body the pivot being located inwardly towards the mechanism from the measuring plane and connected to the mechanism, a workpiece contacting roll mounted on the movable jaw and aligned in parallel relationship with the workpiece contacting surface on the fixed jaw, a tip on the plunger having a wedge surface in engagement with a surface on the movable jaw generally aligned in the measuring plane, the plunger being pressed toward the movable jaw thereby urging the movable jaw to advance its workpiece contacting roll toward the fixed jaw and for translating, by the degree of its taper, the graduated value of the dimension.

6. An indicator snap gage head according to claim 5 further characterized in that the workpiece contacting surface on the fixed jaw is a roll like that on the movable jaw and that the two rolls, when in engagement with a workpiece are oriented in parallel relationship.

7. An indicator snap gage head according to claim 5 further characterized in that the tip of the plunger beyond the wedge surface is truncated to provide clearance into which an adjacent part of the movable jaw is retracted when the plunger is withdrawn out of engagement with the movable jaw.

8. An indicator snap gage assembly comprising an amplifying and indicating mechanism adapted to provide, on the mechanism, a graduated measurement of a dimension of a workpiece in a measuring plane, a gage head releasably coupled to the mechanism and including a base clamped in the mechanism, a plunger slidable in the base in a direction generally perpendicular to the measuring plane, coupled at one end to the mechanism and formed at its opposite end with a wedge-shaped tip, a fixed jaw secured to the base and having a workpiece engaging surface, a movable jaw pivoted on the base, the pivot being located inwardly towards the mechanism from the measuring plane and having a workpiece engaging surface opposed to and generally parallel to the workpiece engaging surface of the fixed jaw and in the measuring plane, the movable jaw being engaged by the wedge-shaped tip of the plunger near the measuring plane and thereby urged to approach the workpiece engaging surface of the fixed jaw and to translate to the mechanism the separation between the fixed and movable jaws.

9. An indicator snap gage assembly according to claim 8 further comprising a workpiece contacting roll on each of the jaws and further characterized in that the tip of the plunger is truncated to provide clearance for an adjacent portion of the movable jaw which is retracted when the plunger is withdrawn out of engagement with the movable jaw.

* * * * *